United States Patent [19]

Lehtinen et al.

[11] Patent Number: 4,530,383

[45] Date of Patent: Jul. 23, 1985

[54] APPARATUS FOR FEEDING THE GROWING SUBSTRATE INTO THE CELLS IN A SET OF GROWING CELLS

[75] Inventors: Jouko Lehtinen, Iso-Vimma; Kari Saarinen, Säkylä, both of Finland

[73] Assignee: Lännen Tehtaat Oy, Iso-Vimma, Finland

[21] Appl. No.: 454,858

[22] Filed: Dec. 30, 1982

[30] Foreign Application Priority Data

Dec. 31, 1981 [FI] Finland .................................. 814225

[51] Int. Cl.³ .............................................. B65B 1/10
[52] U.S. Cl. ........................................ 141/71; 53/527;
100/907; 198/624; 222/272; 222/280; 222/281;
425/447
[58] Field of Search ....................... 222/272, 280, 281;
141/12, 71–80, 392, 125; 100/907, 45, 121;
53/527, 436; 198/624; 366/72; 264/267;
425/447, 449; 164/19, 20

[56] References Cited

U.S. PATENT DOCUMENTS

| | | | |
|---|---|---|---|
| 1,426,615 | 8/1922 | Sutton | 164/20 |
| 1,515,181 | 11/1924 | Toomey et al. | 222/280 |
| 1,705,012 | 3/1929 | Grupe | 222/272 |
| 3,615,044 | 2/1969 | Bonneric | 222/280 |
| 4,002,004 | 1/1977 | Lambert | 141/12 |
| 4,271,876 | 6/1981 | Nash et al. | 141/125 |
| 4,273,495 | 6/1981 | Pannell | 141/125 |

FOREIGN PATENT DOCUMENTS 566820 12/1932 Fed. Rep. of Germany ...... 100/907

*Primary Examiner*—Houston S. Bell, Jr.
*Attorney, Agent, or Firm*—Burns, Doane, Swecker & Mathis

[57] ABSTRACT

The present invention relates to a device for feeding a substrate into the cells of a set of growing cells placed underneath the device. The feeding device includes two horizontal feeding rolls parallel to each other. Each feeding roll includes a plurality of pin elements which project radially from the face of the rolls in an outward direction. The pins are placed in the normal planes of the axes of the feeding rolls in an alternating fashion with respect to the rolls. This arrangement allows the pins to interlock with each other in the vertical plane through which the substrate is fed. The substrate, by the effect of the circumferential velocity of the feeding rolls, is introduced into the cells so as to compact any material deposited earlier into the cells.

1 Claim, 2 Drawing Figures

APPARATUS FOR FEEDING THE GROWING SUBSTRATE INTO THE CELLS IN A SET OF GROWING CELLS

BACKGROUND AND SUMMARY OF THE INVENTION

The present invention is concerned with a method for feeding a growing substrate, such as peat, soil, compost, crushed mineral wool, perlite, vermiculite, or bark, by means of a feeding equipment into the cells of the set of growing cells placed underneath the equipment, whereat the feeding equipment consists of two horizontal feeding rolls, which are placed side by side and which are parallel to each other, pins of a resilient material, e.g. rubber or plastic, preferably polyurethane, being arranged as projecting from the roll faces, the pins projecting radially and being placed in the normal planes of the axes of the feeding rolls alternatingly in each feeding roll so that, in the space between the feeding rolls, the pins on the feeding rolls are placed as interlocking each other, and that the feeding rolls are rotated in opposite directions so that the roll faces directed towards each other have a downwardly oriented direction of rotation.

In the prior art, filling lines have followed two different filling methods. The most common method is the dosage of the filling material onto the cell system by allowing it to fall by the effect of the force of gravitation and compacting by vibrating the cell system and by compacting it from the top by means of various elements, such as brushes or pegs. With this method, in order that a good result could be obtained, a good filling material of uniform quality must be used and, in the case of cell systems of paper, the material must also be relatively dry (relative moisture content below 35%). Cell systems with thin and soft walls do not stand very vigorous compacting, and therefore their filling has been slow and often unsatisfactory.

A second prior-art filling line type operates so that the filling material is first compacted to an appropriate density, and it is coated with a suitable material, cut, and placed into the boxes. The method is slow and expensive, even though the filling result is good. This filling method also operates with less expensive filling materials of inferior quality.

The object of the present invention is to provide a feeding method with properties considerably more favourable than corresponding prior-art methods, and the method in accordance with the invention is mainly characterized in that the filling material of the cells, i.e. the growing substrate, is fed, preferably as moist, at a high speed into the cells by rotating the feeding rolls at a rotation speed of 500 to 1000 r.p.m.—the lower the specific weight of the filling material, the higher the speed of rotation—whereat the filling material is, by the effect of the circumferential velocity of the feeding rolls of about 3 to 10 m/s, rushed in the vertical direction into the cells of the growing cell system so that any filling material introduced into the cells earlier is compacted by means of the kinetic energy of the filling material, beginning from the bottom.

As advantages of the feeding method in accordance with the invention it should be mentioned that an inexpensive filling material is used, it has a high capacity, it does not cause dust problems, because moist filling material can be used therein. The filling material may also be relatively coarse, whereby macropores, which are important for the plants, remain in the cells. The degree of compacting of the feeding equipment is readily adjustable, and the constructional embodiment of the equipment is inexpensive and simple. The feeding equipment functions as a shredder of clodded filling material, but it does not grind the filling material to fine particles.

BRIEF DESCRIPTION OF THE DRAWINGS

The invention comes out more closely from the following description and from the attached drawing, wherein.

DETAILED DESCRIPTION OF THE PREFERRED EMBODIMENT

Figure 1:
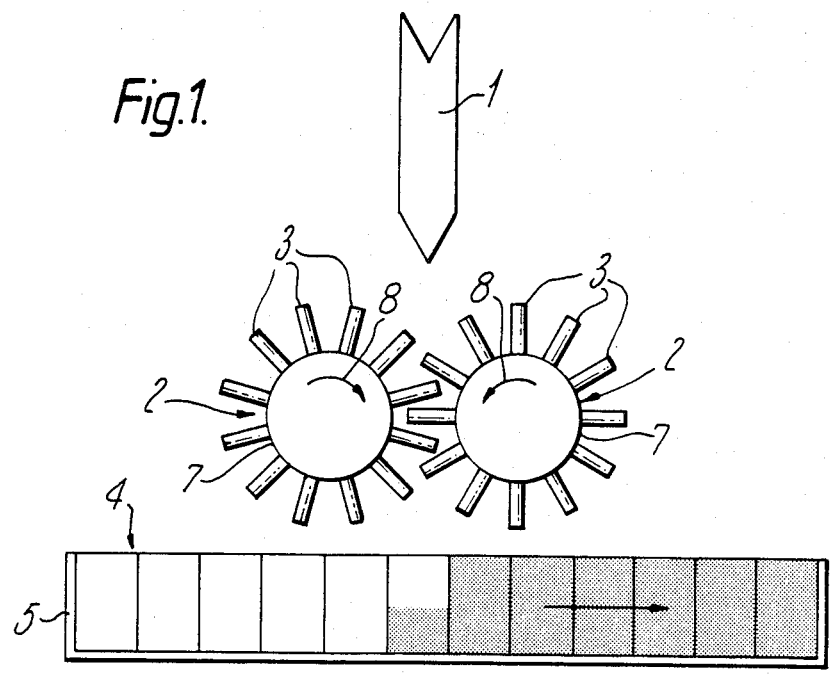
FIG. 1 is a schematical side view of the filling of a growing cell system by means of the feeding equipment, and in FIG. 2 the growing cell system and the feeding equipment are illustrated as viewed from above.
Figure 2:
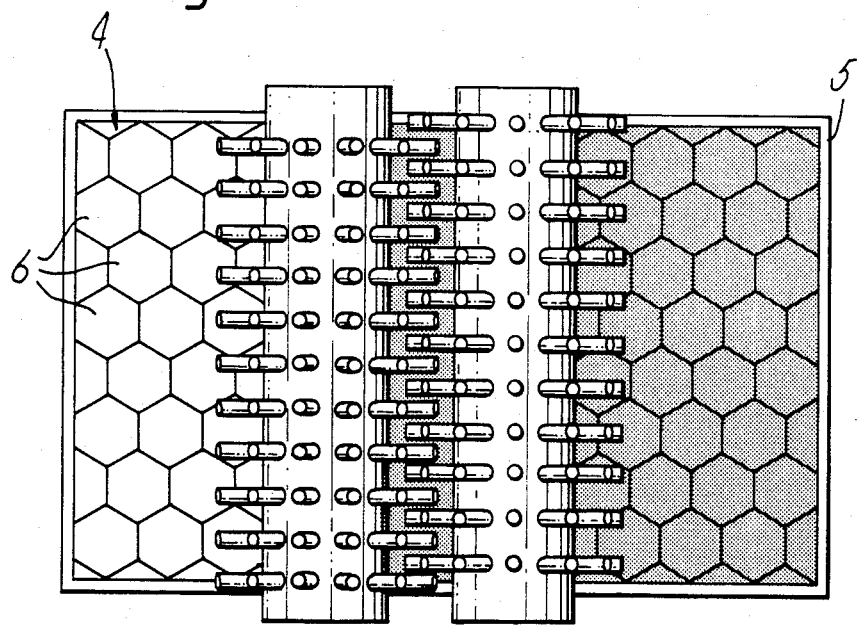

The feeding equipment consists of two horizontal feeding rolls 2 parallel to each other and placed side by side, which are arranged to be rotated in opposite directions in the way shown by arrows 8 in FIG. 1. Pins 3 of a resilient material, such as rubber oR plastic, preferably polyurethane, have been arranged as projecting from the roller faces 7 of the feeding rolls 2. The pins 3 project from the roller faces 7 radially. The pins 3 are placed in the normal planes of the axes of the feeding rolls 2 as uniformly spaced in the longitudinal direction of the feeding rolls 2. Likewise, the pins 3 are located preferably as uniformly spaced around the feeding rolls 2, so that longitudinal lines of pins are formed on the feeding rolls 2 by the pins 3. In the feeding equipment, the feeding rolls 2 are fitted, in accordance with FIGS. 1 and 2, so that in the space between the feeding rolls the pins 3 on the feeding rolls 2 are located as interlocking each other. The width of the space between the feeding rolls 2 must, of course, be larger than the length of the pins 3 in order that the pins 3 should not contact the adjoining roller face. In order that the feeding device should be sufficiently efficient, the pins 3 must overlap each other in the space between the feeding rolls 2 by more than half their length. The diameter of the roller face 7 of the feeding roll 2 is more than half the overall diameter of the feeding roll 2 and projecting pins 3.

The feeding equipment operates as follows. In FIG. 1, the arrow 1 denotes the growing substrate to be fed. The growing substrate, such as peat, soil, compost, crushed mineral wool, perlite, vermiculite, bark, etc., is introduced from the quantity-control device onto the rotary feeding rolls 2 into the space between them, from the top. The circumferential speed of the feeding rolls 2 is most appropriately 3 to 10 m/s. The circumferential speed of the feeding rolls 2 is adjusted low for materials of high specific weight and high for light materials. The feeding rolls 2 and their pins 3 accelerate the filling material to a high vertical speed, by the effect of which the filling material is rushed down to the bottom of the cell system 4 in a box 5 and fills the cells 6 beginning from the bottom so that, at the same time, any material introduced into the cell previously is compacted by means of the kinetic energy of the filling material. The box 5 with the growing cells 4 is placed on a conveyor, which moves the box 5 at a constant speed under the filling position.

What is claimed is:

1. An apparatus for feeding a growing substrate into cells of a set of growing cells comprising two horizontal cylindrical rolls positioned side by side and having parallel axes, a gap between the rolls, a plurality of resilient pins projecting radially outwardly from each outer surface of the rolls in planes normal to the axes of said rolls, the pins on one of the rolls being offset from the pins of the other roll in the direction of the roll axes, the length of the pins being slightly less than the gap between the rolls, each of the rolls rotatably driven in opposite directions at a circumferential velocity of from 3 m/s to 10 m/s so that the outer surfaces of the rolls adjacent the gap have downwardly oriented directions of rotation, the speed of the rolls determined by the specific weight of the growing substrate fed thereinbetween, so that the growing substrate is delivered into the cells with sufficient kinetic energy imparted by the rolls in a manner to compact material of the growing substrate previously introduced into the cells.

* * * * *